United States Patent
Thomen et al.

(10) Patent No.: US 9,982,549 B2
(45) Date of Patent: May 29, 2018

(54) TURBINE UNDER PLATFORM AIR SEAL STRIP

(71) Applicant: United Technologies Corporation, Hartford, CT (US)

(72) Inventors: Seth J. Thomen, Colchester, CT (US); Wieslaw A. Chlus, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1345 days.

(21) Appl. No.: 13/717,913

(22) Filed: Dec. 18, 2012

(65) Prior Publication Data

US 2014/0165591 A1  Jun. 19, 2014

(51) Int. Cl.
  *F01D 5/14* (2006.01)
  *F01D 11/00* (2006.01)
  *F01D 5/30* (2006.01)

(52) U.S. Cl.
  CPC .......... *F01D 11/006* (2013.01); *F01D 5/3007* (2013.01); *F01D 5/3092* (2013.01); *F05D 2300/173* (2013.01)

(58) Field of Classification Search
  CPC ...... F01D 5/3007; F01D 5/3092; F01D 5/326; F01D 11/006
  USPC ............................ 416/219 R, 220 R, 221, 248
  See application file for complete search history.

(56) References Cited

U.S. PATENT DOCUMENTS

| | | | |
|---|---|---|---|
| 4,743,166 A | 5/1988 | Elston, III et al. | |
| 5,137,420 A | 8/1992 | Sigworth et al. | |
| 5,139,389 A | 8/1992 | Eng et al. | |
| 5,191,711 A | 3/1993 | Vickers et al. | |
| 5,846,054 A | 12/1998 | Mannava et al. | |
| 6,296,172 B1 | 10/2001 | Miller | |
| 6,575,704 B1* | 6/2003 | Tiemann | F01D 11/006 416/219 R |
| 7,972,113 B1* | 7/2011 | Davies | 416/214 A |
| 8,215,914 B2 | 7/2012 | Danescu et al. | |

(Continued)

FOREIGN PATENT DOCUMENTS

JP  2010203309  9/2010

OTHER PUBLICATIONS

U.S. Appl. No. 13/537,258, "Turbine Blade Platform With U-Channel Cooling Holes," filed Jun. 29, 2012.

(Continued)

*Primary Examiner* — Jason Shanske
*Assistant Examiner* — Jason Mikus
(74) *Attorney, Agent, or Firm* — Carlson, Gaskey & Olds, P.C.

(57) ABSTRACT

A gas turbine engine stage includes a rotor having a slot. A blade has a root received in the slot, and a shank that extends radially outward from the root to a platform that supports an airfoil. A seal is supported on the shank and in engagement circumferentially between and with the shank and the rotor within the slot. A gas turbine engine includes compressor and turbine sections. The turbine section has a rotor with a slot. A combustor is provided axially between the compressor and turbine sections. A turbine blade in the turbine section includes a root received in the slot and a shank that extends radially outward from the root to a platform that supports an airfoil.

18 Claims, 2 Drawing Sheets

(56) References Cited

U.S. PATENT DOCUMENTS

| | | | |
|---|---|---|---|
| 8,235,664 B2* | 8/2012 | Carchedi | F01D 5/18 |
| | | | 416/248 |
| 2005/0186074 A1 | 8/2005 | Tomita et al. | |
| 2007/0048140 A1 | 3/2007 | Farr et al. | |
| 2010/0068062 A1 | 3/2010 | DiMascio et al. | |
| 2010/0178169 A1 | 7/2010 | Webb | |
| 2013/0224036 A1* | 8/2013 | Lamicq et al. | 416/234 |

OTHER PUBLICATIONS

U.S. Appl. No. 13/609,994, "Turbine Airfoil Platform Rail With Gusset," filed Sep. 11, 2012.
International Search and Written Opinion for PCT/US2013/070682. Search completed on Feb. 27, 2014.
International Preliminary Report on Patentability PCT Application No. PCT/US2013/070682, dated Jul. 2, 2015.
International Search Report and Written Opinion for PCT Application No. PCT/US2013/070682, dated Jul. 2, 2015.
Extended European Search Report for European Application No. 13863951.3, dated Feb. 22, 2016.

* cited by examiner

TURBINE UNDER PLATFORM AIR SEAL STRIP

BACKGROUND

This disclosure relates to a turbine blade for use in, for example, an industrial gas turbine engine. More particularly, the disclosure relates to an air seal strip.

Industrial gas turbine engines include blades having a shank provided between a root and a platform, which supports an airfoil. The root is received in a rotor slot to secure the blade relative to a shaft, which transmits the rotational input to or from the blades. The shank is relatively long, and a portion of the shank may be received in a slot within a turbine rotor, which also receives the root.

One type of root includes multiple undulations configured in a fir-tree shape. A seal is typically provided between the root and the rotor slot to prevent flow from bypassing the blade during engine operation, which would reduce engine efficiency. In one example, a soft aluminum material is adhered to an underside of the undulations at a trailing edge side of the root. The aluminum material is deformed when the turbine blade is inserted into the slot to provide the seal. However, aluminum material is not provided on the shank. Cover plates at the forward and aft locations of the blade and within the slot are relied upon to provide a seal.

SUMMARY

In one exemplary embodiment, a gas turbine engine stage includes a rotor having a slot. A blade has a root received in the slot, and a shank that extends radially outward from the root to a platform that supports an airfoil. A seal is supported on the shank and in engagement circumferentially between and with the shank and the rotor within the slot.

In a further embodiment of any of the above, the root has a firtree shape having at least one undulation and a base at a terminal end opposite the airfoil.

In a further embodiment of any of the above, the seal is a first seal, and further includes second and third seals. The second seal is supported on a side of the at least one undulation opposite the platform and the third seal supported on the base.

In a further embodiment of any of the above, the seal extends from the at least one undulation to the platform.

In a further embodiment of any of the above, the seal is an aluminum alloy.

In a further embodiment of any of the above, the seal has a rectangular cross-section and includes an adhesive strip.

In a further embodiment of any of the above, the blade includes leading and trailing edge sides. The seal is arranged on the shank on the trailing edge sides.

In a further embodiment of any of the above, the blade includes pressure and suction sides. The seal is provided on the shank on each of the pressure and suction sides.

In another exemplary embodiment, a gas turbine engine includes compressor and turbine sections. The turbine section has a rotor with a slot. A combustor is provided axially between the compressor and turbine sections. A turbine blade in the turbine section includes a root received in the slot and a shank that extends radially outward from the root to a platform that supports an airfoil. A seal is supported on the shank and is in engagement circumferentially between and with the shank and the rotor within the slot.

In a further embodiment of any of the above, the gas turbine engine includes a generator operatively coupled to the gas turbine engine, which is a ground-based industrial gas turbine engine, and a power grid operatively connected to the generator.

In a further embodiment of any of the above, the root has a firtree shape having at least one undulation and a base at a terminal end opposite the airfoil.

In a further embodiment of any of the above, the seal is a first seal, and further includes second and third seals. The second seal is supported on a side of the at least one undulation opposite the platform and the third seal supported on the base.

In a further embodiment of any of the above, the seal extends from the at least one undulation to the platform.

In a further embodiment of any of the above, the seal is an aluminum alloy.

In a further embodiment of any of the above, the seal has a rectangular cross-section and includes an adhesive strip.

In a further embodiment of any of the above, the blade includes leading and trailing edge sides. The seal is arranged on the shank on the trailing edge sides.

In a further embodiment of any of the above, the blade includes pressure and suction sides. The seal is provided on the shank on each of the pressure and suction sides.

In another exemplary embodiment, a gas turbine engine blade includes a blade that includes pressure and suction sides and leading and trailing edge sides. The blade has a root. A shank extends radially outward from the root to a platform that supports an airfoil. The root has a firtree shape having at least one undulation and a base at a terminal end opposite the airfoil. A seal is supported on the shank on the trailing edge sides and on each of the pressure and suction sides. The seal extends from the at least one undulation to the platform.

In a further embodiment of any of the above, the seal is a first seal, and further includes second and third seals. The second seal is supported on a side of the at least one undulation opposite the platform and the third seal is supported on the base.

In a further embodiment of any of the above, the seal is an aluminum alloy having a rectangular cross-section.

BRIEF DESCRIPTION OF THE DRAWINGS

The disclosure can be further understood by reference to the following detailed description when considered in connection with the accompanying drawings wherein.

DETAILED DESCRIPTION

Figure 1:
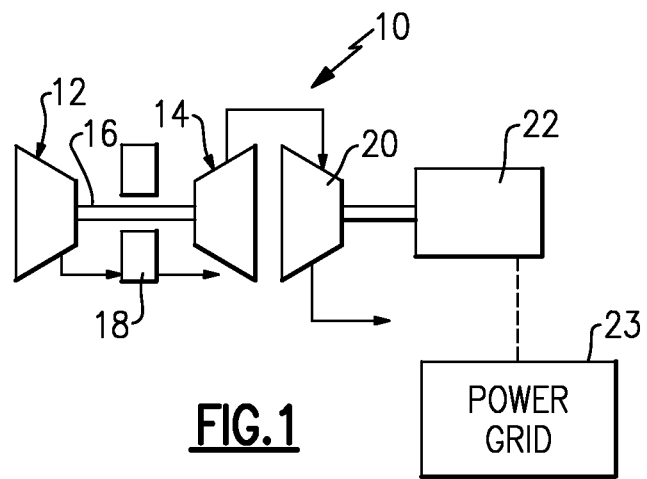
FIG. 1 is a schematic view of an example industrial gas turbine engine.

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. A generator 22 is rotationally driven by a shaft coupled to the turbine or uncoupled via a power turbine, which is connected to a power grid 23. It should be understood that the illustrated engine 10 is highly schematic, and may vary from the configuration illustrated. Moreover, the disclosed airfoil may be used in commercial and military aircraft engines as well as industrial gas turbine engines.

Figure 2:
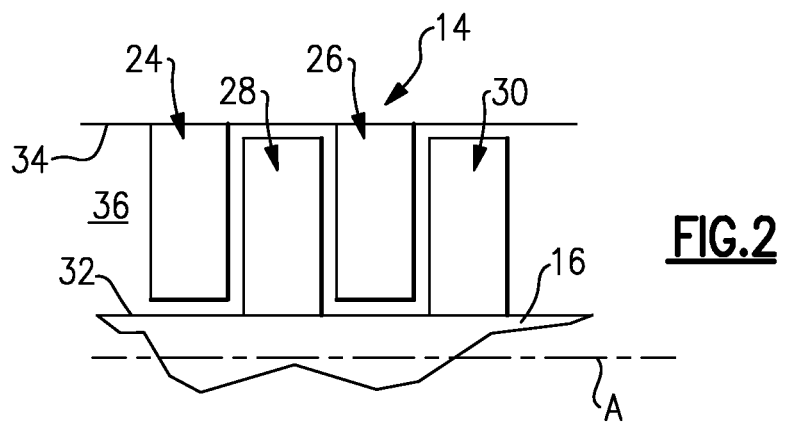
FIG. 2 is a schematic view of a portion of an example turbine section for the industrial gas turbine engine of FIG. 1.

Referring to FIG. 2, an example turbine section 14 is illustrated in more detail. The turbine section 14 includes first and second fixed stages 24, 26. First and second rotating stages 28, 30, which are mounted on the shaft 16, are interleaved between the first and second fixed stages 24, 26. The first and second fixed stages 24, 26 and first and second rotating stages 28, 30 are arranged in a flow path 36 provided between inner and outer flow surfaces 32, 34. It should be understood that greater or fewer stages may be used than illustrated.

Figure 3:
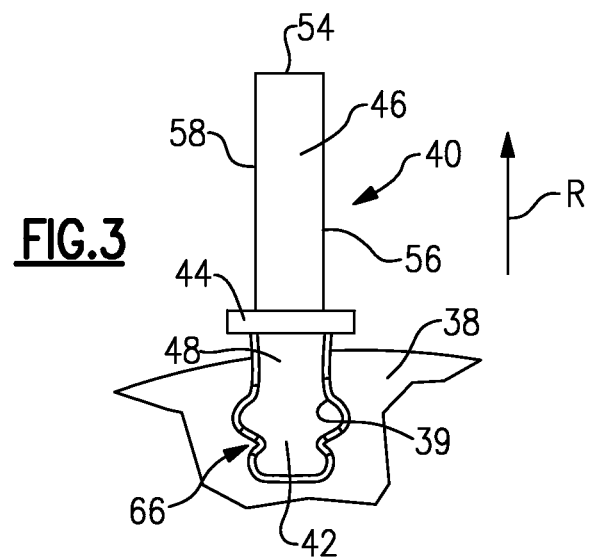
FIG. 3 is a schematic end view of a blade received in a rotor slot for the turbine section shown in FIG. 2.
Figure 4:
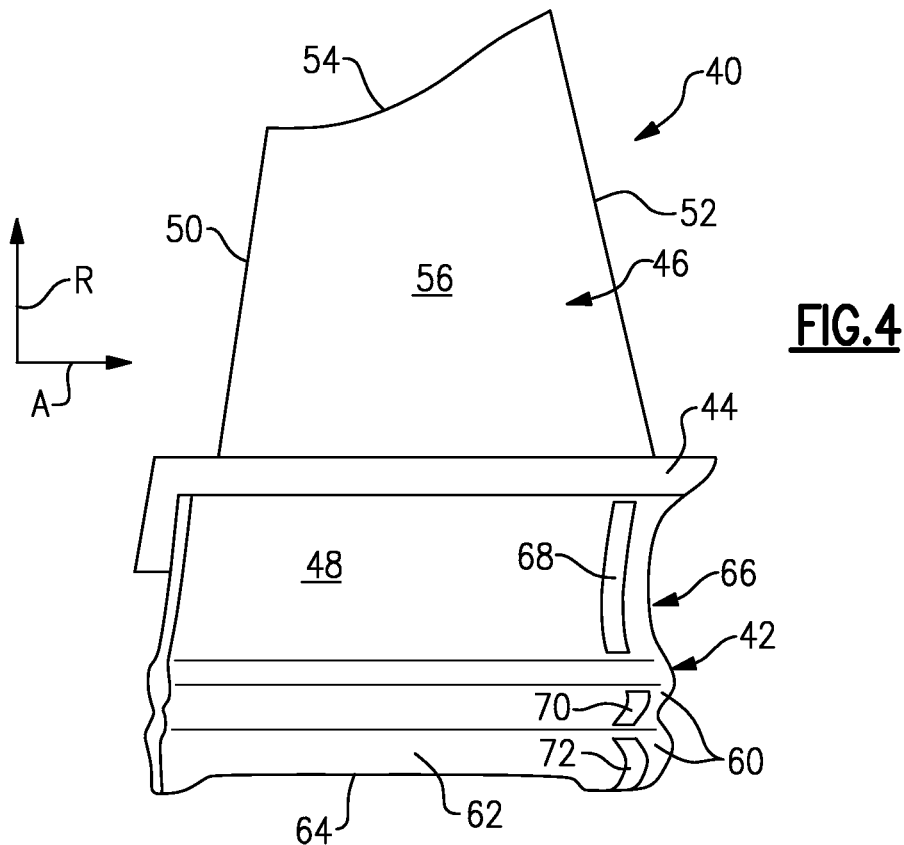
FIG. 4 is a perspective view of an example turbine blade with a seal assembly.

The turbine section 14 includes multiple blades, one of which is illustrated at 40 in FIGS. 3 and 4. In one example, the blade 40 is used in a first stage of the turbine section 14. The blades 40 are arranged circumferentially about the rotor 38 to provide one of the first and second rotating stages 28, 30. The blade 40 may also be used for the compressor section 12, if desired.

In one example, a rotor 38 is supported by the shaft 16. The rotor 38 includes a slot 39 that receives a root 42 of a blade 40. In one example, the root 42 is of a fir tree configuration, as is known in the art. A shank 48 extends radially between and interconnects a platform 44 and the root 42. An airfoil 46 extends in a radial direction R from the platform 44 to a tip 54. The airfoil 46 includes leading and trailing edges 50, 52 and pressure and suctions sides 56, 58.

Referring to FIG. 4, the root 42 includes undulations 60 that are configured in a fir-tree shape that is received in the correspondingly shaped slot 39. The root 42 includes a base 62 at a terminal end 64 on a side of the blade 40 opposite the tip 54. Typically, cooling fluid is fed to the base 62 from the rotor 38 for turbine blade applications.

As shown in FIG. 3, a seal assembly 66 is provided between the blade 40 and slot 39 that prevents airflow in the flow path 36 from leaking past the blade 40 through the slot 39. Referring to FIG. 4, the seal assembly 66 includes first, second and third seals 68, 70, 72, which are discontinuous from one another. The seal assembly 66 is provided on the aft or trailing edge side of the blade 40. In the example, the first, second and third seals 68, 70, 72 are provided on both pressure and suction sides of the root 38 and shank 48.

Figure 6:
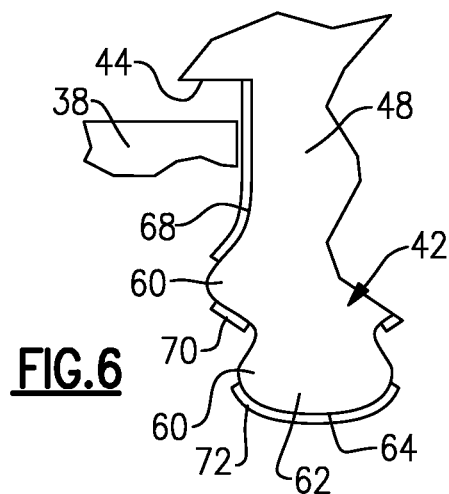
FIG. 6 is an enlarged schematic cross-sectional view of the turbine blade shown in FIG. 3.

The first seal 68 is provided on the shank 48 and extends from the upper side of the topmost undulation 60 (facing the underside of the platform 44, which is opposite the flow path) to the underside of the platform 44. A portion of the shank 48 is received within the slot 39 (best shown in FIG. 6). Thus, the first seal 68 engages circumferentially between and with the shank 44 and the rotor 38 within the slot 39. In this manner, the first seal 68 provides an air seal between the shank 48 and the rotor 38 to prevent flow through this portion of the slot 39 as well. This design may be used with or without cover plates.

The second seal 70 is provided on an underside of at least one of the undulations 60 on a side opposite the platform. The third seal 72 wraps about the base 62. Thus, second and third seals 70, 72 are provided on the unloaded side of the undulations 60.

Figure 5:
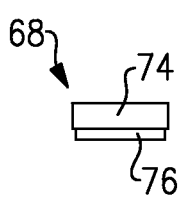
FIG. 5 is an end view of an example seal of the seal assembly.

Referring to FIG. 5, the seal 68 includes an aluminum alloy substrate 74, for example, which is sufficiently soft so as to be plastically deformed during assembly of the blade 40 into the rotor 38. The deformed substrate 74 creates an air seal, which prevents airflow in the flow path 36 from leaking past the blade 40 through the slot 39. An adhesive 76 is provided on one side of the substrate 74 to secure the seal 68 to the blade 40. Alternatively, the substrate 74 may be deposited directly onto the surface of the blade 40. Other seal materials may also be used.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine stage comprising:
   a rotor having a slot;
   a blade having a root received in the slot, and a shank that extends radially outward from the root to a platform that supports an airfoil, wherein the root has a firtree shape having at least one undulation and a base at a terminal end opposite the airfoil, the at least one undulation includes a radially outermost undulation nearest the airfoil, wherein the shank is arranged radially outward of the radially outermost undulation; and
   a seal supported on the shank and in engagement circumferentially between and with the shank and the rotor within the slot.

2. The gas turbine engine stage according to claim 1, wherein the seal is a first seal, and further comprising second and third seals, the second seal supported on a side of the at least one undulation opposite the platform, and the third seal supported on the base.

3. The gas turbine engine stage according to claim 1, wherein the seal extends from the at least one undulation to the platform.

4. The gas turbine engine stage according to claim 1, wherein the seal is an aluminum alloy.

5. The gas turbine engine stage according to claim 3, wherein the seal has a rectangular cross-section and includes an adhesive strip.

6. The gas turbine engine stage according to claim 1, wherein the blade includes leading and trailing edge sides, and the seal is arranged on the shank on the trailing edge sides.

7. The gas turbine engine stage according to claim 1, wherein the blade includes pressure and suction sides, and the seal is provided on the shank on each of the pressure and suction sides.

8. A gas turbine engine comprising:
   a compressor section and a turbine section, the turbine section having a rotor with a slot;
   a combustor provided axially between the compressor and turbine sections;
   a turbine blade in the turbine section including:
     a root received in the slot, and a shank that extends radially outward from the root to a platform that supports an airfoil, wherein the root has a firtree shape having at least one undulation and a base at a terminal end opposite the airfoil, the at least one undulation includes a radially outermost undulation nearest the airfoil, wherein the shank is arranged radially outward of the radially outermost undulation; and
     a seal supported on the shank and in engagement circumferentially between and with the shank and the rotor within the slot.

9. The gas turbine engine according to claim 8, comprising a generator operatively coupled to the gas turbine engine, which is a ground-based industrial gas turbine engine, and a power grid operatively connected to the generator.

10. The gas turbine engine according to claim 8, wherein the seal is a first seal, and further comprising second and third seals, the second seal supported on a side of the at least one undulation opposite the platform, and the third seal supported on the base.

11. The gas turbine engine according to claim 8, wherein the seal extends from the at least one undulation to the platform.

12. The gas turbine engine according to claim 8, wherein the seal is an aluminum alloy.

13. The gas turbine engine according to claim 12, wherein the seal has a rectangular cross-section and includes an adhesive strip.

14. The gas turbine engine according to claim 8, wherein the blade includes leading and trailing edge sides, and the seal is arranged on the shank on the trailing edge sides.

15. The gas turbine engine according to claim 8, wherein the blade includes pressure and suction sides, and the seal is provided on the shank on each of the pressure and suction sides.

16. A gas turbine engine blade comprising:

pressure and suction sides and leading and trailing edge sides, the blade has a root, and a shank extends radially outward from the root to a platform that supports an airfoil, the root has a firtree shape having at least one undulation and a base at a terminal end opposite the airfoil, the at least one undulation includes a radially outermost undulation nearest the airfoil, wherein the shank is arranged radially outward of the radially outermost undulation; and a seal supported on the shank on the trailing edge sides and on each of the pressure and suction sides, the seal extends from the at least one undulation to the platform.

17. The gas turbine engine blade according to claim 16, wherein the seal is a first seal, and further comprising second and third seals, the second seal supported on a side of the at least one undulation opposite the platform, and the third seal supported on the base.

18. The gas turbine engine blade according to claim 16, wherein the seal is an aluminum alloy having a rectangular cross-section.

\* \* \* \* \*